Oct. 31, 1961 R. P. LAPPALA ET AL 3,006,818
METHOD OF FABRICATING SOLAR STILL
IN CONTINUOUS LENGTHS
Filed May 31, 1957 3 Sheets-Sheet 3
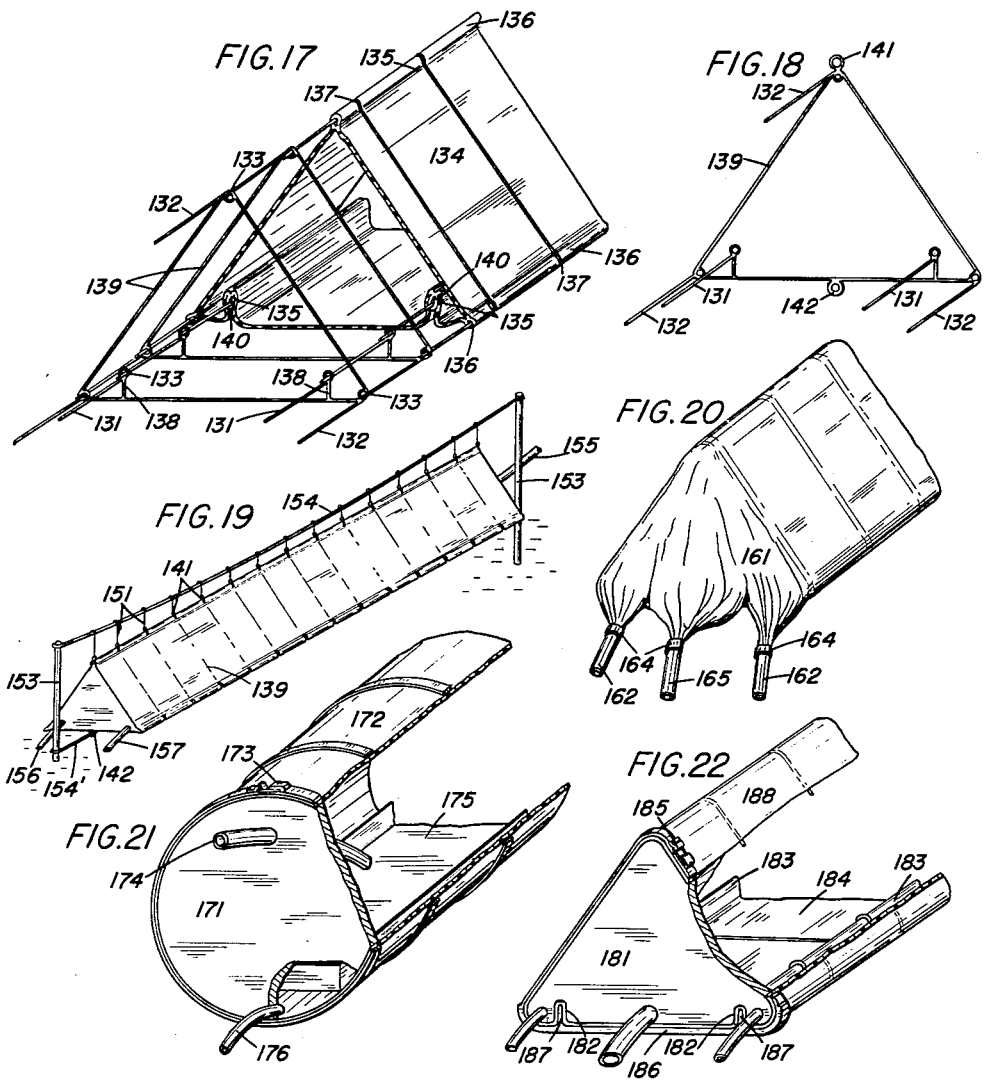
INVENTORS
RISTO P. LAPPALA
HARRY O. RENNAT
BY
John L. Diehl
Attorney United States Patent Office 3,006,818
Patented Oct. 31, 1961

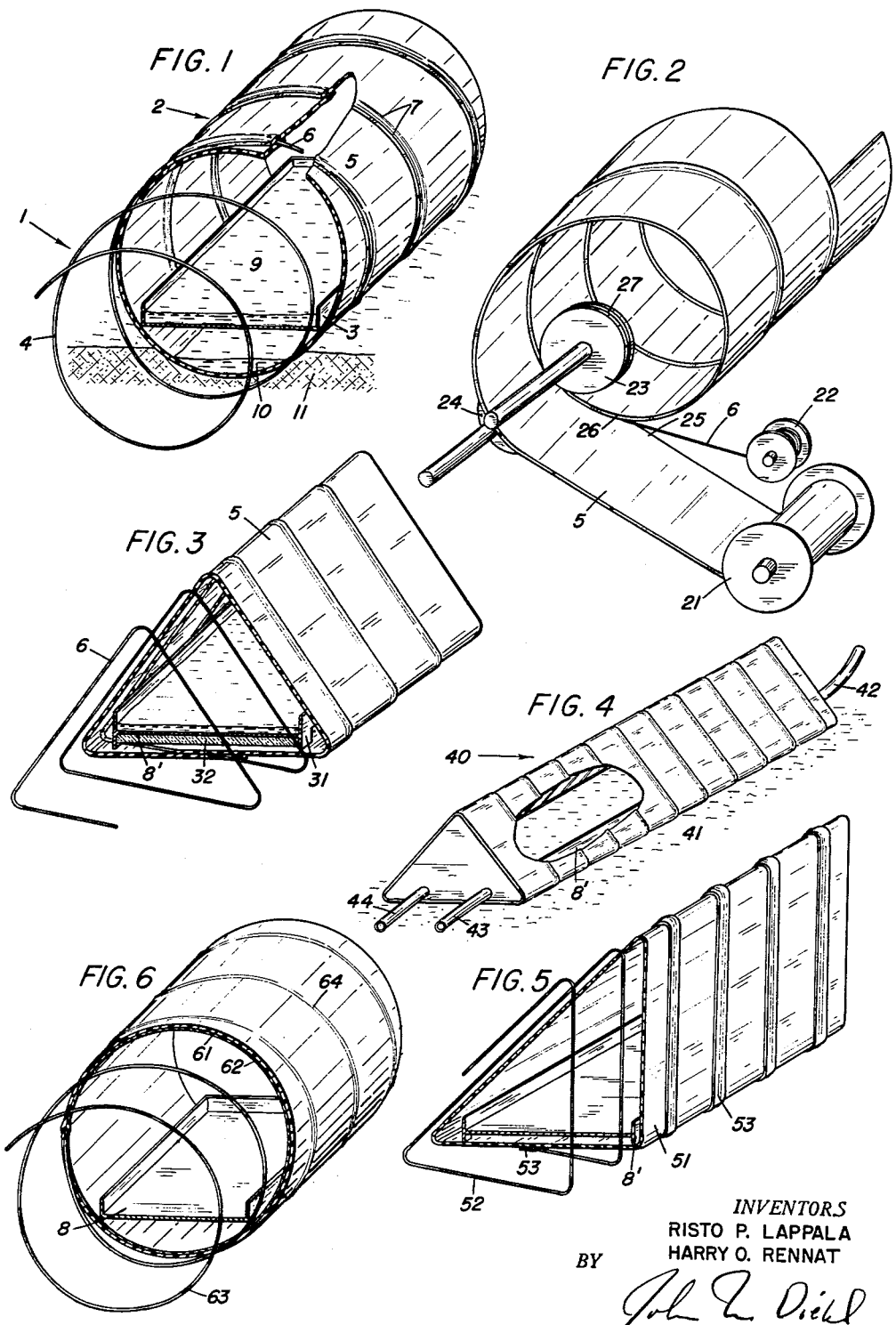

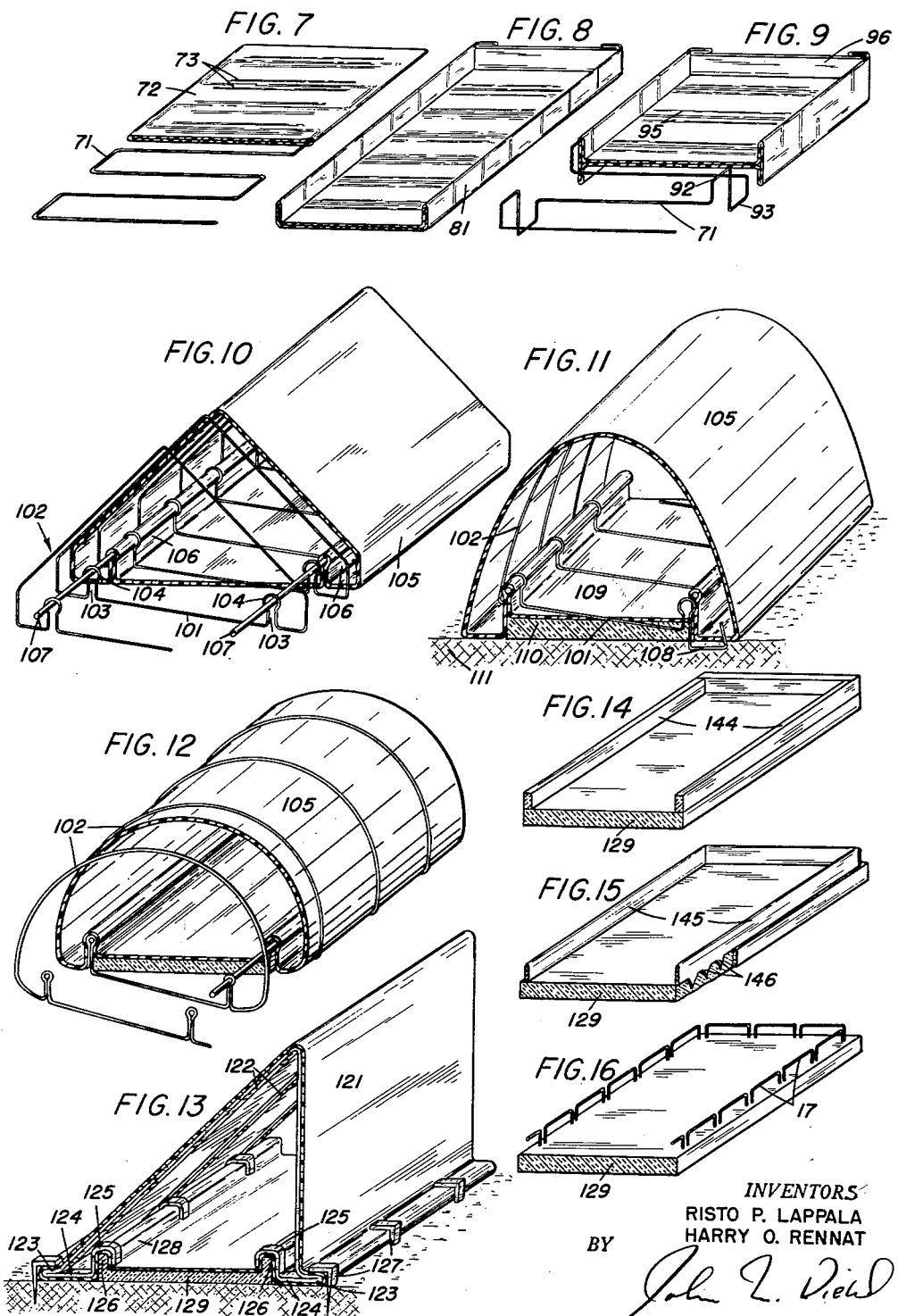

3,006,818
METHOD OF FABRICATING SOLAR STILL IN CONTINUOUS LENGTHS
Risto P. Lappala, Madison, Wis., and Harry O. Rennat, Fort Collins, Colo., assignors to Bjorksten Research Laboratories, Inc., Fitchburg, Wis., a corporation of Illinois
Filed May 31, 1957, Ser. No. 662,666
10 Claims. (Cl. 202—234)

This invention relates to solar stills and more particularly to solar stills of substantially continuous lengths comprising wire framework and plastic films.

A primary objective in the development of solar stills has been to minimize the total cost of water produced consistent with satisfactory performance and operational life. Heretofore solar stills have been built of materials of such thicknesses that their cost has been prohibitive of any large scale use.

This invention utilizes thin plastic films and wire or plastic supports in a novel and inexpensive combination which can be adapted to a large variety of still designs.

The object of this invention is therefore to provide an inexpensive method for building solar stills of long continuous lengths.

Another object of the invention is to furnish novel constructtions for solar stills.

Another object of the invention is to provide collapsible still structures for easy transportation.

Other objects of the invention will become apparent from the drawings and detailed description which are intended to illustrate the applicability of the invention without thereby limiting its scope to less than that of all those equivalents which will be apparent to one skilled in the art.

In the figures, like numerals refer to like parts and:

FIGURE 1 is a partially cross-sectional, partially perspective view of a solar still of circular cross section;

FIGURE 2 is a perspective view showing a method of making the solar still in FIGURE 1;

FIGURE 3 is a partially cross-sectional, partially perspective view of another embodiment of the invention having a triangular cross section;

FIGURE 4 is a perspective, partially cut away, view of a solar still in operation;

FIGURE 5 is a partially cross-sectional, partially perspective view of another embodiment of the invention with a triangular cross-section;

FIGURE 6 is a partially cross-sectional, partially perspective view of another still of circular cross section;

FIGURE 7 is a perspective view of a method for making salt water trays for solar stills;

FIGURE 8 is a perspective view of a half-finished tray made by the method of FIGURE 7;

FIGURE 9 is a perspective view of a method for making another embodiment of a tray;

FIGURE 10 is a partially cross-sectional, partially perspective view of a still in which the salt water channel is an integral part of the still;

FIGURE 11 is a partially cross-sectional, partially perspective view of another still with an integral salt water channel;

FIGURE 12 is a partially cross-sectional, partially perspective view of another modification of the still in FIGURE 10;

FIGURE 13 is a partially cross-sectional, partially perspective view of another embodiment of the invention;

FIGURE 14 is a partially cross-sectional, partially perspective view of a base plate used with the device of FIGURE 13;

FIGURE 15 is a partially cross-sectional, partially perspective view of another base plate used with the device of FIGURE 13;

FIGURE 16 is a partially cross-sectional, partially perspective view of still another base plate used with the device of FIGURE 13;

FIGURE 17 is a partially cross-sectional, partially perspective view of still another embodiment;

FIGURE 18 is a perspective view of a slight modification of the frame unit of FIGURE 17;

FIGURE 19 is a perspective view of a hanging-type still of the construction of FIGURE 17;

FIGURE 20 is a perspective view of a method of closing the end of a still;

FIGURE 21 is a partially perspective, partially cut-away view of a still with an end plate;

FIGURE 22 is a partially perspective, partially cut-away view of a still employing a different type of end plate.

Referring now to FIGURE 1, there is shown a section of a solar still comprising a continuous wire support, indicated generally as 1, a transparent plastic cover indicated generally as 2, and a salt water tray 3 resting inside the continuous wire support and transparent cover.

The wire support 1 consists of a number of interconnected wire sections 4 which form a circular spiral of any desired length. Around this wire support there is wrapped a continuous plastic sheet 5 which is slightly wider than the spacing between the wire sections so that the edges of said sheet overlap and cover wire 6. The overlapping edges of sheet 5 on either side of wire 6 can be fastened together by heat sealing as shown at 7, by gluing or by some other suitable means, thereby rendering a watertight structure wherein the wire frame work is protected from any contact with moisture or other corrosion-promoting agents. This is an important feature of this construction because it makes it possible to use inexpensive wire materials which would corrode easily under ordinary conditions.

In operation, solar radiation passes through sheet 5 and falls on tray 3 which is filled with sea water 9 causing said water to evaporate. Water vapor coming in contact with the cooler plastic walls condenses, trickles down on the walls and collects in the well 10 below tray 3. This portion of the still does not receive any solar radiation and is kept cool by the ground 11 on which the still is resting, therefore re-evaporation is kept to a minimum.

FIGURE 2 shows the manufacture of a solar still of the type shown in FIGURE 1. The continuous transparent sheet 5 and the wire 6 are wound off the reels 21 and 22 respectively and are then fed into a heat-sealing machine of which, for simplicity, only the sealing wheels 23 and 24 are shown. Edge 25 of sheet 5 is made to overlap edge 26 of the already finished part of the still in such a way that wire 6 is placed between and in the center of the overlapping edges. After the sheets and the wire have been positioned properly, the edges 25 and 26 are sealed by heated wheels 23 and 24 of the heat-sealing machine. The sealing wheels are provided with grooves 27 which have a radius slightly larger than that of the wire, in order to obtain a seam on either side of the wire without damaging the portions of the sheet covering the wire.

This method provides a simple means for making cylindrical structures of any desired length particularly adaptable to solar stills. Though this structure is basically of a cylindrical cross section, it can be easily formed into any other desired shape. For example, FIGURE 3 shows a solar still of triangular cross section comprising continuous triangular wire 6 and covering sheet 5 which is of the same general construction as the still in FIGURE 1. Because the still of FIGURE 3 has a flat bottom, the salt water tray 8' is provided with legs 31 in order to avoid direct contact of distilled water, at the bottom of the still, with the salt water tray which would promote evaporation of sweet water. Following this principle, the efficiency of the still can be further increased by placing a layer of insulating material 32 under tray 8′.

FIGURE 4 shows a still of this invention in operation, which may have the inner construction of the still of FIGURE 3. The still 40 is resting on ground 41, which may be slightly down graded toward pipes 43 and 44 in order to facilitate the movement of salt water through tray 8′. Tubes 42 and 43 are connected to tray 8′ and serve as inlet and outlet pipes, respectively, for salt water. Tube 44 is connected to the still near the base of same and serves as an outlet for distilled water.

FIGURE 5 shows another embodiment of the invention. In this construction, the transparent cover 51 is a continuous tubing and the continuous external wire framework 52 is secured to cover 51 by means of a separate continuous transparent strip 53 which is heat sealed or cemented to cover 51. The strip 53 may also be a pressure-sensitive tape. The joining of the strip or tape to the cover sheet can be done over any practical length in a continuous process similar to the one shown in FIGURE 2.

FIGURE 6 shows a structure similar to that of FIGURE 1 but which employs two concentric and continuous transparent tubings 61 and 62. The wire framework 63 is placed between the tubings and the inner and outer layers of said tubings are heat sealed together as shown at 64.

Referring now to FIGURES 7 and 8, there is shown a method of making inexpensive trays for salt water which can be used in stills of the construction of FIGURES 1 and 6. A piece of wire 71 is bent in the horizontal plane into a rectangular zig-zag frame and inserted into a flat tubing 72 of some flexible water- and corrosion-resistant material. At the same time, some cement can be introduced to hold the materials together or they may be joined by heat sealing as shown by seams 73. This wire-reinforced sheet can now be hand folded or stamped into any desired shape, as for example, into that of tray 81 in FIGURE 8.

This method can also be used to make a tray of a more intricate form like the one of FIGURE 9 wherein the tray is provided with legs. A tray of this type would be particularly adapted to stills with a flat bottom, for example, as shown in FIGURES 3 and 5. A piece of wire 71 is bent into the shape shown wherein the wire first runs in the horizontal plane, then forms an upward square loop 92 and a downward square loop 93 in a vertical plane perpendicular to the horizontal run, makes another horizontal run and continues in the way described. A tubular cover piece of the proper size is pulled over this wire framework and heat sealed between the horizontal portions of the wire frame as shown at 95. The ends of the structure can then be bent upward as at 96 to form a closed tray.

Referring now to FIGURES 10 and 11, there is shown another embodiment of the invention where the horizontal bottom section 101 of the wire support 102 has two vertical loops 103 forming a ring 104 on the upper end of said vertical loops. This construction provides a salt water tray integral with the main body of the still and also has the advantage that the tubular cover 105 can be attached to the wire framework 102 in a very simple way without heat sealing or cementing.

The cover 105 is placed over the wire support 102 and folds 106 of said cover are pulled up through the vertical loops 103 into rings 104. Then rods 107 are pushed through said loops inside folds 106 thus locking these folds inside the wire loops. Thus, three channels are obtained of which the center one is used as a salt water tray and the outer ones for collecting the distilled water condensing on the walls.

The use of longitudinal rods 107 has also the advantage of giving the structure additional rigidity.

The construction of the still in FIGURE 11 differs from that in FIGURE 10 by having the portions 108 of the supporting wire 102, which form the sweet water channels, positioned lower than the main portion 101 of the horizontal wire. Thus, a space is provided between the ground 111 and the salt water channel 109 which can be filled with insulating material 110 in order to reduce the heat loss from the salt water channel to the ground and to improve the efficiency of the still.

The still in FIGURE 12 has a structure basically similar to those of FIGURES 10 and 11 except that the spiral framework 102 is outside the cover sheet 105. Said sheet retains its shape by a slightly higher pressure than the atmospheric inside the still which is easily maintained by a fan which is not shown.

FIGURE 13 shows another different aspect of the invention which employs separate frame units and has a salt water channel integral with the main body of the still. The framework supporting the tubular transparent cover 121 consists of individual supports 122 which are each made of a flat strip of material bent into a substantially triangular shape, and a base part 129. On either side of the base of the triangle the flat frame material is first bent into a short flat loop 123 extending horizontally outward and then made to follow the base of the triangle for short horizontal strips 124 toward the center of the base where they end in short vertical loops 125. The base part 129 consists of a flat plate, preferably of some insulating material, and of two vertical strips 126. Said strips can be integral parts of the base plate as shown, separate bars 144 as shown in FIGURE 14, thin metal bars 145 provided with spikes 146 as shown in FIGURE 15, or simply large staples 147 driven into the base plate as shown in FIGURE 16.

In assembling the still, the frames 122 are placed inside the tubular cover 121 and on the base 129 in such a way that vertical extensions 126 of said base come inside vertical loops 125 of frame 122 and form upright folds 128 in the base portion of cover 121. The horizontal extensions 123 of frames 122 covered by sheet 121 are then secured to the ground by means of stakes 127.

Another embodiment of the invention which also employs separate frame units and has water channels integral with the still is shown in FIGURE 17. A significant feature of this still is that the transparent sheet is supported by an exterior framework. The vertical wire frame units 139, which are basically of triangular shape, have five parallel and equally long prongs 131 and 132 perpendicular to the plane of the triangle. Three prongs 132 extend from the corners of the triangle and the two other prongs 131 are horizontal extensions of two vertical wire portions 138 connected to the base of the triangle. At each point where the prongs join the triangular frame, the wire is formed into a small ring 133 in the plane of the triangle. The continuous cover sheet 134 has five small portions of the sheet folded longitudinally and heat sealed in continuous seams 135 to form small tubes 136 and adapted to receive prongs 131 and 132. Small openings 137 are cut into these tubes at distances slightly shorter than the length of the prongs of the wire supports.

When assembling the still, the wire frames 139 are placed over the tubular cover 134 and the prongs 131 and 132 are pushed into the tubes 136 through openings 137. Since the prongs are slightly longer than the distance between the openings, the ends of the prongs of one frame come to rest in rings 133 of the frame before it. Thus, a connected framework is formed exterior to cover 134.

The prongs 131 on vertical wire extensions 138 on the base of the triangle make folds 140 in the base portion of cover sheet 134 and thus form channels for distilled and salt water.

FIGURE 18 shows a modification of the wire frames described in connection with FIGURE 17. Two small rings 141 and 142 which are either soldered to wire supports 139 or formed as an integral part thereof, are located on the wire frame at the vertex and at the center of the base of the triangle. As shown in FIGURE 19, hangers 151 attached to rings 141 on wire frames 139 are used to hang the still up on a cable 154 between posts 153. A second cable 154' is run through rings 142 and also attached to posts 153 so as to prevent the still from swinging in the wind. Salt water enters the still through tube 155 and due to a slight downgrading of the still toward tubes 156 and 157, distilled water and concentrated salt water are removed at the opposite end of the still through tubes 156 and 157 respectively.

Referring now to FIGURES 20, 21 and 22, there are shown several ways of closing the ends of stills of this invention and attaching the inlet and outlet tubes. A simple but efficient way of closing the ends of a still is shown in FIGURE 20 where the portions of the flexible cover sheet 161, close to the sweet water channels, are crimped together and attached to outlet tubes 162 by means of hose clamps 164. Similarly, the center portion of the cover sheet is folded and provided with an outlet tube 165 for salt water.

FIGURE 21 shows the end of a still having a rigid endplate 171 which can be heat sealed or cemented to cover sheet 172 or can be attached by a band clamp 173 as shown for easy disassembly. The endplate 171 is provided with tube 174 to carry salt water into tray 175 and with tube 176 for removal of sweet water.

FIGURE 22 shows a modification of the endplate of FIGURE 21 which can be used for closing the stills where the salt water channel forms an integral part of the still. The plate 181, which is made of a somewhat flexible material, is provided with two vertical slots 182 which correspond to the folds 183 in the cover of the still forming the salt water channel 184. The band clamp 185 has a rigid base portion 186 with two upright vertical protrusions 187 which fit into slots 182 of plate 181. The folds 183 of cover sheet 188 are placed into slots 182 and pressed against the walls of said slot by protrusions 187 of clamp 185, and because of the slight flexibility of the plate material a watertight joint between the cover 188 and the plate 181 will be obtained.

As construction materials for the transparent cover, plastics have to be used which have sufficient dimensional stability. For instance, sheeting or fiber of synthetic resins such as polyvinylidene chloride, cellulose acetate, cellulose acetate butyrate, polystyrene, polystyrene lucite polyester, phenol-formaldehyde and urea-formaldehyde may be used.

For the framework, low-grade steel wire can be used in all constructions where the wire is sealed inside the plastic, for example, illustrated in FIGURES 1, 3, 5, 6, 7 and 9. For other constructions, especially for those with the framework inside the still, corrosion-resistant materials such as copper, aluminum and various alloys such as stainless steel, bronze and others can be used. Low-grade steel wire coated with corrosion-resisting metals or with plastic, rubber or glass may be also used. In addition, completely non-metallic frame structures can be made of materials like plastic, such as rigid unplasticized polyvinyl chloride vulcanized fiber, transite and masonite.

It is thus seen that the invention is broad in scope and is not to be restricted excepting by the claims, in which it is our intention to cover all novelty inherent in this invention as broadly as possible, in view of prior art.

Having thus disclosed our invention, we claim:

1. A solar still fabricated from wire and plastic comprising: a continuous, helical wire framework, two rods and a transparent plastic cover; said framework comprising two upright loops on the base wire of each segment of said wire helix, each loop having a ring and a narrow portion which in combination looks like a cotter pin, said loops separated by a distance on the base wires of each segment of the wire helix, and said loops in series comprising two parallel rows of loops separated by said distance; said transparent cover wrapped around the exterior of said wire framework and drawn up through the narrow portions and rings of said series of loops; one of said rods drawn through the rings of one row of said plastic covered loops and another rod drawn through the the rings of the other row of said plastic covered loops; said wire framework and still in combination having three parallel channels of substantially unlimited length separated by said parallel rows of plastic covered loops, the walls of said channels formed by said two rows of plastic covered loops.

2. A solar still fabricated from wire and plastic comprising a continuous triangular helical wire framework having two rods and a transparent plastic cover; said framework comprising two upright loops on the base wire of each segment of said wire helix, each loop having a ring and a narrow portion which in combination looks like a cotter pin, said loops separated by a distance on the base wires of each segment of the wire helix, and said loops in series comprising two parallel rows of loops separated by said distance; said transparent cover wrapped around the exterior of said wire framework and drawn up through the narrow portions and rings of said series of loops; one of said rods drawn through the rings of one row of said plastic cover loops and another rod drawn through the rings of the other row of said plastic covered loops; said wire framework and still in combination having three parallel channels of substantially unlimited length separated by said parallel rows of plastic covered loops, the walls of said channels formed by said two rows of plastic covered loops.

3. A solar still fabricated from wire and plastic comprising a continuous partially circular, helical wire framework having two rods and a transparent plastic cover; said framework comprising two upright loops on the base wire of each segment of said wire helix, each loop having a ring and a narrow portion which in combination looks like a cotter pin, said loops separated by a distance on the base wires of each segment of the wire helix, and said loops in series comprising two parallel rows of loops separated by said distance; said transparent cover wrapped around the exterior of said wire framework and drawn up through the narrow portions and rings of said series of loops; one of said rods drawn through the rings of one row of said plastic covered loops and another rod drawn through the rings of the other row of said plastic covered loops; said wire framework and still in combination having three parallel channels of substantially unlimited length separated by said parallel rows of plastic covered loops, the walls of said channels formed by said two rows of plastic covered loops.

4. A solar still fabricated from wire and plastic comprising a continuous helical wire framework, two rods and a transparent plastic cover; said framework comprising two upright loops on the base wire of each segment of said wire helix, each doop having a ring and a narrow portion which in combination looks like a cotter pin, said loops separated by a distance on the base wires of each segment of the wire helix, and said loops in series comprising two parallel rows of loops separated by said distance; said transparent cover wrapped around the interior of said wire framework; said wire framework and still in combination having three parallel channels of substantially unlimited length separated by said two parallel rows of plastic lined loops, the walls of said channels formed by said two rows of plastic covered loops.

5. A solar still fabricated from wire and plastic comprising a continuous triangular helical wire framework, two rods and a transparent plastic cover; said framework comprising two upright loops on the base wire of each segment of said wire helix, each loop having a ring and a narrow portion which in combination looks like a cotter pin, said loops separated by a distance on the base wires of each segment of the wire helix, and said loops in series comprising two parallel rows of loops separated by said distance; said transparent cover wrapped around the interior of said wire framework; said wire framework and still in combination having three parallel channels of substantially unlimited length separated by said two parallel rows of plastic lined loops, the walls of said channels formed by said two rows of plastic covered loops.

6. A solar still fabricated from wire and plastic comprising a continuous partially circular helical wire framework, two rods and a transparent plastic cover; said framework comprising two upright loops on the lowermost portion of each segment of said wire helix, each loop having a ring and a narrow portion which in combination looks like a cotter pin, said loops separated by a distance on the lowermost portion of each segment of the wire helix, and said loops in series comprising two parallel rows of loops separated by said distance; said transparent cover wrapped around the interior of said wire framework; said wire framework and still in combination having three parallel channels of substantially unlimited length separated by said two parallel rows of plastic lined loops, the walls of said channels formed by said two rows of plastic covered loops.

7. A solar still of the type described comprising: a framework having a series of individual frame units, a plastic, transparent cover, and a base comprising a rectangular box with vertical sides; each of said frame units having a triangular shape and two pairs of loops extending from the lowermost portion of said triangle, one pair of said loops extending outwardly and sidewardly from the triangle's base vertices and the other loop pair separated by a distance, extending inwardly and upwardly from the lowermost portion of said triangle into the space enclosed by the triangle and all loops in combination forming two parallel rows of loops separated by said distance; said cover extending around said frame units; the upright sides of said box inserted into said loops extending upwardly and inwardly into said space enclosed by the triangular frame units; said series of wire frame units, base and plastic cover in combination comprising a tubular still having three parallel channels of substantially unlimited length separated by said loops into which said upright sides of said base are inserted, the wall of said channels formed by the upright walls of said box resting in said upward loops.

8. A solar still of the type described comprising a partially circular framework having a series of individual frame units, a plastic, transparent cover, and a base comprising a rectangular box with vertical sides; each of said frame units having a triangular shape and two pairs of loops extending from the lowermost portion of said triangle, one pair of said loops extending outwardly and sidewardly from the triangle's base vertices and the other loop pair separated by a distance extending inwardly and upwardly from the lowermost portion of said triangle into the space enclosed by the triangle and all loops in combination forming two parallel rows of loops separated by said distance; said cover extending around said frame units; the upright sides of said box inserted into said loops extending upwardly and inwardly into said space enclosed by the triangular frame units; said series of wire frame units, base and plastic cover in combination comprising a tubular still having three parallel channels of substantially unlimited length separated by said loops into which said upright sides of said base are inserted, the walls of said channels formed by the upright walls of said box resting in said upward loops.

9. A solar still of the type described comprising a rectangular framework having a series of individual frame units, a plastic, transparent cover, and a base comprising a rectangular box with vertical sides; each of said frame units having a triangular shape and two pairs of loops extending from the lowermost portion of said triangle, one pair of said loops extending outwardly and sidewardly from the triangle's base vertices and the other loop pair separated by a distance extending inwardly and upwardly from the lowermost portion of said triangle into the space enclosed by the triangle and all loops in combination forming two parallel rows of loops separated by said distance, said cover extending around said frame units; the upright sides of said box inserted into said loops extending upwardly and inwardly into said space enclosed by the triangular frame units; said series of wire frame units, base and plastic cover in combination comprising a tubular still having three parallel channels of substantially unlimited length separated by said loops into which said upright sides of said base are inserted, the walls of said channels formed by the upright walls of said box resting in said upward loops.

10. A solar still fabricated from wire and plastic comprising: a wire framework comprised of a series of individual frame units and a transparent, plastic cover; said individual frame units comprising a triangular wire having a loop at each vertice, a wire prong extending perpendicularly from each vertice, all prongs extending in the same direction, two L-shaped wires separated by a distance and extending from the lowermost portion of each of said wire triangular units, one wire of said L-shape being vertical and fastened to the lowermost portion of said triangle, and the other wire of said L-shape extending perpendicular to the tip of said vertical wire, all such perpendicular wires extending in the same direction as said prongs, and each of said L-shaped wires having a loop at the top of the vertical wire; a transparent, plastic cover comprising an envelope having five seams, said seams having a slit at predisposed uniform distances; said frame units and plastic cover in combination comprising a tubular still in which each of said prongs of each wire unit rest in a separate seam of said cover so that the two prong ends of the L-shaped wires in one triangular unit rest in the rings on the L-shaped wires of the preceding wire unit; said cover extending around the exterior of the lateral sides of said wire framework and extending over the L-shaped basal wires in such a fashion as to create a plurality of basal compartments.

References Cited in the file of this patent

UNITED STATES PATENTS

| | | |
|---|---|---|
| 2,508,774 | Roberts | May 23, 1950 |
| 2,683,466 | Guiles | July 13, 1954 |
| 2,715,914 | Roberts | Aug. 23, 1955 |
| 2,807,912 | Bjorksten | Oct. 1, 1957 |
| 2,813,063 | Bjorksten | Nov. 12, 1957 |
| 2,822,857 | Rothermel et al. | Feb. 11, 1958 |
| 2,825,365 | Meyers et al. | Mar. 4, 1958 |
| 2,848,389 | Bjorksten | Aug. 19, 1958 |

OTHER REFERENCES

Second Annual Report of the Secretary of the Interior on Saline Water Conversion, January, 1954, page 35 relied on.

Third Annual Report on Saline Water Conversion, January, 1955, pages 8, 27, 80 to 85 relied on.